(12) United States Patent
Kubota et al.

(10) Patent No.: US 6,169,165 B1
(45) Date of Patent: Jan. 2, 2001

(54) METHOD FOR PRODUCING POLYBENZAZOLE

(75) Inventors: Fuyuhiko Kubota; Masahiko Fukushima; Makiko Koyama, all of Ohtsu (JP)

(73) Assignee: Toyo Boseki Kabushiki Kaisha, Osaka (JP)

( * ) Notice: Under 35 U.S.C. 154(b), the term of this patent shall be extended for 0 days.

(21) Appl. No.: 09/219,414

(22) Filed: Dec. 23, 1998

(30) Foreign Application Priority Data

Dec. 24, 1997 (JP) .................................................. 9-355078

(51) Int. Cl.[7] .............................. C08F 6/00; C08G 63/00; C08G 69/26
(52) U.S. Cl. .................... 528/486; 528/335; 528/183; 528/280; 528/288; 528/291; 528/332; 528/336; 528/348
(58) Field of Search .................... 528/335, 183, 528/280, 288, 291, 332, 336, 348, 486

(56) References Cited

U.S. PATENT DOCUMENTS

| 4,142,021 | 2/1979 | Dixon et al. | 428/412 |
| 5,142,021 | * 8/1992 | Lysenko et al. | 528/348 |
| 5,276,128 | * 1/1994 | Rosenberg et al. | 528/184 |
| 5,552,221 | * 9/1996 | So et al. | 428/373 |
| 5,919,890 | * 7/1999 | Hotta et al. | 528/184 |

FOREIGN PATENT DOCUMENTS

| 0 805 173 A1 | 5/1997 | (EP) . |
| 63-301224 | 8/1988 | (JP) . |

OTHER PUBLICATIONS

Week 86057 Jun. 1983, Derwent Publications Ltd., London, GB; AN 86034098, Korshak et al.: "Method of obtaining/ 1,3–di–(2–benzimidazolyl)–4,6–diamino/–benzol" and SU 1 167 183 A (Inst. Khim Im V I Nikitina) abstract only.

* cited by examiner

*Primary Examiner*—Duc Truong
(74) *Attorney, Agent, or Firm*—Morrison & Forester LLP

(57) ABSTRACT

A method for producing polybenzazole in the presence of iron(II) ion. The polybenzazole obtained by this method can be formed into a highly strong fiber having a high elastic modulus and a heat resistant film. The method enables economical production of polybenzazole having fine tone and high polymerization degree.

4 Claims, No Drawings

METHOD FOR PRODUCING POLYBENZAZOLE

TECHNICAL FIELD OF THE INVENTION

The present invention relates to a method for producing polybenzazole capable of forming a highs strong fiber having a high elastic modulus, a heat resistant film and the like. More particularly, the present invention relates to a method for economically producing polybenzazole having a fine tone and a high polymerization degree in the presence of iron(II) ion during polymerization, thereby to facilitate recyclization of a polymerization solvent as compared to conventional reducing agents and to reduce the burden on the environment.

BACKGROUND OF THE INVENTION

Polybenzazole, represented by cis- or transpoly (paraphenylene benzbisoxazole), cis- or transpoly (paraphenylene benzbisthiazole), cis- or transpoly (paraphenylene benzbisimidazole) and the like, is a polymer of the following formula [d] and is known to be obtainable by condensation polymerization of compound (a) and compound (b) in a non-oxidizing solvent having dehydrating action, such as polyphosphoric acid, methanesulfonic acid and a mixture thereof, as shown by the following formula (1):

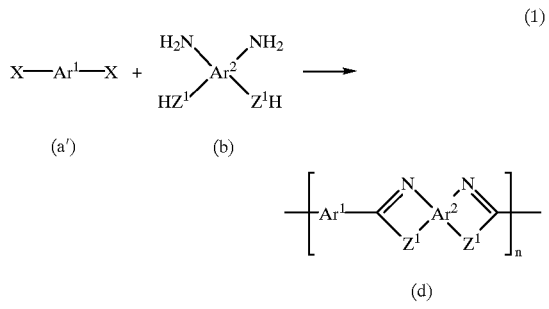

wherein $Ar^1$ is aromatic divalent group, $Ar^2$ is an aromatic group bonded to four groups, each $Z^1$ is —O—, —S— or —NH—, each X is a functional group having an electron-deficient carbon group, such as carboxyl group, carboxylic halide group, haloalkyl, nitrile and the like, and n is an integer of 100–500.

Instead of using compound (a') and compound (b) as mentioned above as starting materials, polybenzazole can be obtained by, as disclosed in U.S. Pat. No. 5,276,128, using a polybenzazole monomer salt compound of the formula (c) as a main stating material.

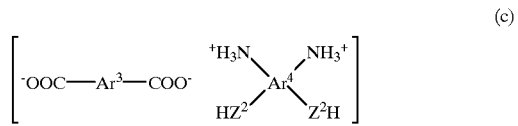

wherein $Ar^3$ is an aromatic divalent group, $Ar^4$ is an aromatic group bonded to four groups and each $Z^2$ is —O—, —S— or —NH—.

Polybenzazole obtained in the above is formed into fiber, film and the like and put to practical use. Starting monomers of polybenzazole, such as compound (b) and compound (c), and early reaction products are unstable to heat, light, oxygen and the like, resulting in partial decomposition thereof in the polymerization reaction system. Consequently, problems of discoloration and insufficient polymerization degree have been created.

To solve the above-mentioned problems, Japanese Patent Examined Publication No. 6-21166 discloses a method for producing polybenzazole having a high polymerization degree and showing less discoloration, by the presence of a reducing oxygen acid compound of phosphorus or sulfur in the reaction mixture.

In this method, however, the reaction temperature is limited such that it prevents degradation of polymer quality caused by thermal decomposition of the reducing oxygen acid compound of phosphorus or sulfur. This in turn lowers the reaction rate of polymerization and may make economical production of polybenzazole difficult.

In the production of polybenzazole, large amounts of wastes of polyphosphoric acid and methanesulfonic acid, which are non-oxidizing solvents having dehydrating action, and mixtures thereof are generated. When the reducing oxygen acid compound is used for polymerization, the waste may not be easily recyclable for use in polymerization or other purposes, or economical recycling thereof may be difficult U.S. Pat. No. 5,142,021 discloses a method for inhibiting coloring and lower polymerization degree of polybenzazole by adding a reducing agent such as tin(II) halide or a hydrate thereof. As shown in an example of this patent, the effect provided by the use of tin(II) chloride dihydrate is not sufficient and the tin ion contained in the waste limits the recycled use thereof.

In addition, tin(II) chloride dihydrate generates hydrogen chloride gas upon heating and some measures are needed to secure safety of operators and facilities.

It is therefore an object of the present invention to provide a method for producing polybenzazole having a fine tone and a high polymerization degree, and the present invention aims at facilitating the recycled use of the waste produced during the production process, thereby enabling economical production of polybenzazole.

SUMMARY OF THE INVENTION

The present invention provides the use of iron(II) ion for the production of polybenzazole. In particular, the presence of iron(II) ion during polymerization has enabled production of a polymer having a fine tone and a high polymerization degree even by polymerization of compound (c) (the compound (c) has prevented conventional reducing agents' action to inhibit discoloration). Accordingly, the present invention relates to a method of production of polybenzazole, comprising reacting a compound of the formula (a):

wherein $Ar^1$ is an aromatic divalent group and each R is a hydroxyl group, alkoxy having 1 to 7 carbon atoms or halogen atom, and a compound of the formula (b):

wherein $Ar^2$ is an aromatic divalent group and each $Z^1$ is —O—, —S— or —NH—, in the presence of iron(II) ion, or obtaining polybenzazole from a monomer salt compound of the formula (c):

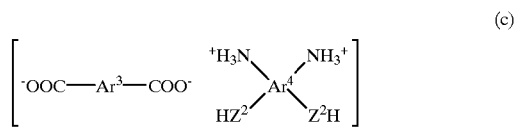

(c)

wherein $Ar^3$ is an aromatic divalent group, $Ar^4$ is an aromatic group bonded to four groups and each $Z^2$ is —O—, —S— or —NH—, in the presence of iron(II) ion.

DETAILED DESCRIPTION OF THE INVENTION

The iron(II) ion to be used in the present invention can be introduced by consistence of a salt compound thereof with starting monomers of polybenzazole in advance or by addition thereof to a polymerization system. Examples of the salt compound include iron(II) ammonium sulfate hexahydrate, iron(II) chloride anhydride, iron(II) chloride tetrahydrate, iron(II) fumarate, iron(II) lactate, iron(II) oxalate dihydrate, iron(II) sulfate anhydrate, iron(II) sulfate heptahydrate, iron (II) sulfide, iron(II) phosphate octahydrate and the like. Any compound is effective as long as it shows reducing performance.

It is more preferable to add an iron compound, such as iron(II) phosphate and iron(II) sulfate, rather than iron(II) chloride that generates hydrogen chloride gas during polymerization process, in consideration of easy handling, facilities required and safety of operators.

The iron(II) ion is preferably derived from hydrate rather than divalent iron salt anhydrate, since it dissolves in a solvent faster and more uniformly When the solvent for polymerization is a polyphosphoric acid, and waste thereof is to be recycled for the production of polybenzazole or other uses to reduce production costs, and further, iron(II) fumarate, iron(II) lactate, iron(II) sate and the like are used as the derivation of iron(II) ion, fumaric acid, lactic acid, oxalic acid and the like need to be removed for purification. When iron(II) phosphate hydrate is used, such step is not necessary and this method is economically beneficial.

The iron(II) ion is added before initiation of reduction of monomer materials of polybenzazole and side materials, such as solvent and mixture thereof. It may be added in plural portions at plural points in time.

The amount of the iron(II) ion to be added is not subject to any particular limitation and it is added in a proportion of 10–10000 ppm, preferably 50–8000 ppm, particularly preferably 100–5000 ppm, of aromatic compound of compound (b) or (c).

The starting monomers of polybenzazole to be used in the present invention are the aforementioned compound (a) and compound (b) or a compound (c).

$Ar^1$, $Ar^2$, $Ar^3$ and $Ar^4$ in the compounds (a), (b) and (c) are divalent aromatic groups having 6 to 12 carbon atoms, which are exemplified by phenylene group, bisphenylene group, oxybisphenylene group, naphthylene group and the like, with preference given to phenylene group. R of compound (a) is preferably hydroxyl group, alkoxy having 1 to 7 carbon atoms or halogen atom, and compound (a) is exemplified by terephthalic acid, isophthalic acid, 4,4'-bis (benzoic acid), 4,4'-oxybis(benzoic acid), dicarboxylic acids (e.g., 2,6-naphthalene dicarboxylic acid), and the like. In addition, their derivatives such as dicarboxylic halide compounds (e.g., terephthanoyl chloride) and dicarboxylate compounds (e.g., dimethyl terephthalate) may be used.

$Z^1$ and $Z^2$ of compounds (b) and (c) may be —O—, —S— or —NH—. Examples of compound (b) include 4,6-diaminoresorcinol, 2,4 diamino-1,5-dithiobenezene, 2,5-diamino-1,4-dithiobenzene, 1,2,4,5-tetraminobenzene, 3',3, 4',4-biphenyltetramin and the like. Inorganic salts (e.g., hydrochloride, sulfate, phosphate and the like) of these compounds may be also used.

Examples of compound (c) include terephthalates such as 4,6-diaminoresorcinol, 2,4-diamino-1,5-dithiobenzene, 2,5-diamino-1,4-dithiobenzene and the like, isophthalate, 4,4'-bisbenzoate, 4,4'-oxybisbenzoate, and the like, with preference given to terephthalate such as 4,6-diaminoresorcinol, 2,4-diamino-1,5-dithiobenzene and 2,5-diamino-1,4-dithiobenzene.

Equimolar amounts of 4,6-diaminoresorcinol dihydrochloride and terephthalic acid, 116% polyphosphoric acid, phosphorus pentaoxide and iron(II) phosphate octahydrate are weighed and placed in a polymerization apparatus equipped with a stirrer, and the mixture is heated at 60–80° C. for 1–2 hours and then 3–5 hours to 110–130° C. The mixture is heated to 135° C. over 10–30 min and reacted for 12 hours at the same temperature. Finally, the mixture is heated to 200° C. over 0.5–2 hours to allow polymerization for 1–3 hours at the same temperature to give pale-yellow to yellow polybenzazole having an intrinsic viscosity of 40–100 dL/g.

The thus-obtained polybenzazole can be formed into fiber) film, sheet and the like, which in turn can be used for various reinforcing materials, high tension materials, heat resistant felt, heat resistant woven fabric, sports wear, bullet-proof vest, heat resistant film and the like.

The present invention is described in more detail by way of examples, to which the present invention is not limited.

The intrinsic viscosity in the examples was measured according to the method described in Macromolecules, 1993, 26, 5174-84 (HIS method) using methanesulfonic acid as a solvent at 25° C. The color of the polymer was visually observed after freeze-pulverization of polybenzazole solution, extraction to remove solvent with hot water and dying in vacuo.

EXAMPLE 1

4,6-Diaminoresorcinol dihydrochloride (9.1 g, 42.8 mmol), terephthalic acid (7.1 g, 42.8 mmol), 116% polyphosphoric acid (43.3 g), phosphorus pentoxide (15.0 g) and iron(II) phosphate octahydrate [$Fe_3(PO_4)_2$ $8H_2O$, 0.245 g, iron(II) ion 3000 ppm relative to 4,6-diaminoresorcinol dihydrochloride) were weighed and placed in a polymerization apparatus equipped with a stirrer, and the mixture was heated at 70° C. for one hour and 15 min. then for 3.5 hours to 120° C. while stirring under dry nitrogen. The mixture was heated to 135° C. over 15 min and reacted for 12 hours at the same temperature. Finally, the mixture was heated to 200° C. over one hour and reacted for 2 hours at the same temperature. The obtained polybenzazole had an intrinsic viscosity of 64.4 dL/g and its color was yellow.

COMPARATIVE EXAMPLE 1-1

4,6-Diaminoresorcinol dihydrochloride (9.1 g, 42.8 mmol), terephthalic acid (7. 1 g, 42.8 mmol), 116% polyphosphoric acid (43.3 g), phosphorus pentoxide (15.0 g), and phosphorous acid ($H_3PO_3$, 0.270 g), which is a reducing oxygen acid phosphorus compound, were weighed and placed in a polymerization apparatus equipped with a stirrer, and the mixture was heated at 70° C. for one hour and 15 min, then for 3.5 hours to 120° C. while stirring under dry nitrogen. The mixture was heated to 135° C. over 15 min and reacted for 12 hours at the same temperature. Finally, the mixture was heated to 200° C. over one hour and reacted for 2 hours at the same temperature.

The obtained polybenzazole had an intrinsic viscosity of 38.5 dL/g and its color was yellow-green.

COMPARATIVE EXAMPLE 1-2

4,6-Diaminoresorcinol dihydrochloride (9.1 g, 42.8 mmol), terephthalic acid (7.1 g, 42.8 mmol), 116% polyphosphoric acid (43.3 g), phosphorus pentoxide (15.0 g), and tin(II) chloride dihydrate [$SnCl_2$ $2H_2O$, 0.054 g, tin(II) ion 3000 ppm relative to 4,6 diaminoresorcinol dihydrochloride) were weighed and placed in a polymerization apparatus equipped with a stirrer, and the mixture was heated at 70° C. for one hour and 15 min, then for 3.5 hours to 120° C. while stirring under dry nitrogen. The mire was heated to 135° C. over 15 min and reacted for 12 hours at the same temperature. Finally, the mixture was heated to 200° C. over one hour and reacted for 2 hours at the same temperature. The obtained polybenzazole had an intrinsic viscosity of 50.5 dL/g and its color was yellow.

EXAMPLE 2

4,6-Diaminoresorcinol/terephthalate (13.1 g, 42.8 mmol), 116% polyphosphoric acid (43.3 g), phosphorus pentoxide (15.0 g) and iron(II) phosphate octahydrate (0.245 g) were weighed and placed in a polymerization apparatus equipped with a stirrer, and the mixture was heated at 70° C. for one hour and 15 min, then for 3.5 hours to 120° C. while stirring under dry nitrogen. The mixture was heated to 135° C. over 15 min and reacted for 12 hours at the same temperature. Finally, the mixture was heated to 200° C. over one hour and reacted for 2 hours at the same temperature. The obtained polybenzazole had an intrinsic viscosity of 79.8 dL/g and its color was yellow.

COMPARATIVE EXAMPLE 2-1

4,6-Diaminoresorcinol/terephthalate (13.1 g, 42.8 mmol), 116% polyphosphoric acid (43.3 g), phosphorus pentoxide (15.0 g) and phosphorous acid (0.270 g, a reducing oxygen acid phosphorus compound) were weighed and placed in a polymerization apparatus equipped with a stirrer, and the mixture was heated at 70° C. for one hour and 15 min, then for 3.5 hours to 120° C. while stirring under dry nitrogen. The mixture was heated to 135° C. over 15 min and reacted for 12 hours at the same temperature. Finally, the mixture was heated to 200° C. over one hour and reacted for 2 hours at the same temperature. The obtained polybenzazole had an intrinsic viscosity of 46.1 dL/g and its color was purple.

COMPARATIVE EXAMPLE 2-2

4,6-Diaminoresorcinol/terephthalate (13.1 g, 42.8 mmol), 116% polyphosphoric acid (43.3 g), phosphorus pentoxide (15.0 g) and tin(II) chloride dihydrate (0.054 g) were weighed and placed in a polymerization apparatus equipped with a stirrer, and mixture was heated at 70° C. for one hour and 15 min, then for 3.5 hours to 120° C. while stirring under dry nitrogen. The mixture was heated to 135° C. over 15 min and reacted for 12 hours at the same temperature. Finally, the mixture was heated to 200° C. over one hour and reacted for 2 hours at the same temperature. The obtained polybenzazole had an intrinsic viscosity of 57.4 dL/g and its color was purple.

According to the inventive production method of polybenzazole, a polymer with fine tone and high polymerization degree can be obtained. This method is economical and contributes greatly to the pertinent field of industries.

This application is based on application No. 355078/1997 filed in Japan, the content of which is incorporated hereinto by reference.

What is claimed is:

1. A method of production of polybenzazole, comprising reacting a compound of the formula (a)

(a)

wherein $Ar^1$ is an aromatic divalent group and each R is a hydroxyl group, alkoxy having 1 to 7 carbon atoms or halogen atom, and a compound of the formula (b):

(b)

wherein $Ar^2$ is an aromatic group and each $Z^1$ is —O—, —S— or —NH—, in the presence of iron(II) ion, or obtaining polybenzazole from a monomer salt compound of the formula (c):

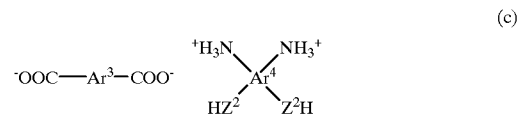

(c)

wherein $Ar^3$ is an aromatic divalent group, $Ar^4$ is an aromatic group and each $Z^2$ is —O—, —S— or —NH—, in the presence of iron(II) ion.

2. The method of claim 1, wherein the iron(II) ion is derived from iron(II) chloride, iron(II) phosphate or a hydrate thereof.

3. The method of claim 1, wherein the iron(II) ion is derived from a hydrate of iron(II) salt.

4. The method of claim 1, wherein the polybenzazole is produced in a non-oxidizing solvent having a dehydrating action.

* * * * *